(12) United States Patent
Martin (10) Patent No.: US 11,623,763 B2
(45) Date of Patent: Apr. 11, 2023

(54) GRAVITY SIMULATION SYSTEM

(71) Applicant: Kipling Martin, Aurora, CO (US)

(72) Inventor: Kipling Martin, Aurora, CO (US)

( * ) Notice: Subject to any disclaimer, the term of this patent is extended or adjusted under 35 U.S.C. 154(b) by 379 days.

(21) Appl. No.: 16/945,738

(22) Filed: Jul. 31, 2020

(65) Prior Publication Data

US 2022/0033102 A1 Feb. 3, 2022

(51) Int. Cl.
*G01C 23/00* (2006.01)
*B64D 47/00* (2006.01)
*B64C 19/02* (2006.01)

(52) U.S. Cl.
CPC .............. *B64D 47/00* (2013.01); *B64C 19/02* (2013.01)

(58) Field of Classification Search
CPC ................................. B64D 47/00; B64C 19/02
USPC ........................................................... 701/3
See application file for complete search history.

(56) References Cited

U.S. PATENT DOCUMENTS

| | | | | |
|---|---|---|---|---|
| 3,270,441 A | * | 9/1966 | Hewes | B64G 7/00 472/80 |
| 5,240,416 A | * | 8/1993 | Bennington | G09B 9/16 434/48 |
| 5,498,161 A | * | 3/1996 | Noble, Jr. | G09B 9/10 434/59 |
| 6,743,019 B2 | * | 6/2004 | Ransom | B64D 47/00 434/34 |
| 9,359,088 B2 | * | 6/2016 | May | G05D 1/0816 |
| 10,829,222 B2 | * | 11/2020 | De La Garza | B64D 11/06395 |
| 2007/0128582 A1 | * | 6/2007 | Anderson | G06Q 10/02 434/30 |
| 2007/0215746 A1 | * | 9/2007 | Rieken | B64C 39/06 244/45 R |
| 2017/0046968 A1 | * | 2/2017 | Gato | G06F 30/15 |
| 2020/0156798 A1 | * | 5/2020 | Mastrolia | B64D 25/10 |

* cited by examiner

*Primary Examiner* — Shardul D Patel
(74) *Attorney, Agent, or Firm* — The Iwashko Law Firm, PLLC; Lev Ivan Gabriel Iwashko (57) ABSTRACT

A gravity simulation system, including a computing system running a program thereon to receive input for a gravity environment and calculate the gravity environment based on a predetermined gravity algorithm, and a gravity simulation aircraft connected to the computing system to simulate the gravity environment received from the computing system based on at least one of a flight setting and a gravity setting.

16 Claims, 6 Drawing Sheets

FIG. 4

GRAVITY SIMULATION SYSTEM

BACKGROUND

1. Field

The present general inventive concept relates generally to a simulation system, and particularly, to a gravity simulation system.

2. Description of the Related Art

In 1995, an American film known as "Apollo 13" was released in theaters to critical acclaim. Due to the nature of the film, the director anticipated difficulty recreating scenes of weightlessness for actors who portrayed astronauts. It would have been logistically too difficult to film and have actors move around underwater.

However, one promising solution that was suggested included the use of a reduced-gravity aircraft. The reduced-gravity aircraft is a type of aircraft that provides near weightless environments, which is primarily based on performing a parabolic flight that was proposed by a German aerospace engineer during the 1950s.

The parabolic flight generally requires the reduced-gravity aircraft to fly in a parabolic manner. More specifically, the reduced-gravity aircraft will ascend at a first angle relative to a ground surface, and after reaching a predetermined height, the reduced-gravity aircraft will descend at a second angle relative to the ground surface. Moreover, during the ascent, the reduced-gravity aircraft is manipulated, such that engine thrust is reduced and a nose is lowered at a top of a parabola, which simulates the near weightless environment.

The National Aeronautics and Space Administration (NASA) facilitated filming of "Apollo 13" by granting access to one of its reduced-gravity aircraft during filming. Unfortunately, NASA ceased operations of its reduced gravity programs in July 2014.

Currently, Zero Gravity Corporation (ZERO-G) has a contract with NASA to use reduced-gravity aircraft to continue parabolic flights. ZERO-G provides commercial services, such that the general public can purchase a flight to experience the near weightless environment.

As described above, the reduced-gravity aircraft is limited to performing parabolic flights in order to simulate near weightless environments. In other words, the reduced-gravity aircraft must perform a particular flight pattern in order to simulate near weightlessness. Also, the reduced-gravity aircraft is limited to providing only reduced-gravity and/or weightless experiences.

Therefore, there is a need for a system that can simulate different gravitational forces.

SUMMARY

The present general inventive concept provides a gravity simulation system.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a gravity simulation system, including a computing system running a program thereon to receive input for a gravity environment and calculate the gravity environment based on a predetermined gravity algorithm, and a gravity simulation aircraft connected to the computing system to simulate the gravity environment received from the computing system based on at least one of a flight setting and a gravity setting.

The gravity simulation aircraft may include a body, and a platform assembly disposed within at least a portion of the body to move based on at least one of the flight setting and the gravity setting.

The gravity simulation aircraft may further include a transceiver disposed within at least a portion of the body to receive at least one command from the computing system, and a motor connected to the transceiver and the platform assembly to move the platform assembly in response to the at least one command received from the transceiver.

The platform assembly may include a main platform to receive at least one user thereon.

The platform assembly may further include a first auxiliary platform removably disposed on at least a portion of a bottom surface of the main platform, a second auxiliary platform removably disposed on at least a portion of the bottom surface of the main platform, a plurality of auxiliary rails disposed on a first side and a second side of the main platform to suspend therefrom, a plurality of first auxiliary rollers disposed within at least a portion of the plurality of auxiliary rails at a first end of the main platform to move the first auxiliary platform at least partially away from a center of the main platform in response to rotating in a first direction, and to move the first auxiliary platform at least partially toward the center of the main platform in response to rotating in a second direction, a plurality of second auxiliary rollers disposed within at least a portion of the plurality of auxiliary rails at a second end of the main platform to move the second auxiliary platform at least partially away from a center of the main platform in response to rotating in the second direction, and to move the second auxiliary platform at least partially toward the center of the main platform in response to rotating in the first direction, such that the first auxiliary platform and the second auxiliary platform move in opposite directions, a first rod disposed on at least a portion of the first auxiliary platform to connect each of the plurality of first auxiliary rollers, and a second rod disposed on at least a portion of the second auxiliary platform to connect each of the plurality of second auxiliary rollers.

The gravity simulation system may further include a track assembly disposed within at least a portion of the body, and a plurality of rollers, including a plurality of first rollers disposed within at least a portion of the track assembly to move the first auxiliary platform at least partially toward a center of a ceiling of the body in response to rotating in the first direction, and to move the first auxiliary platform at least partially toward a center of a base of the body in response to rotating in the second direction, a plurality of second rollers disposed within at least a portion of the track assembly to move the second auxiliary platform at least partially toward the center of the base of the body in response to rotating in the first direction, and to move the second auxiliary platform at least partially toward the center of the ceiling of the body in response to rotating in the second direction, a first axle disposed on at least a portion of the first auxiliary platform to connect each of the plurality of first rollers, and a second axle disposed on at least a portion of the second auxiliary platform to connect each of the plurality of second rollers.

The track assembly may include a plurality of first tracks removably disposed on at least a portion of a first end of the body to receive the plurality of first rollers therein, and a plurality of second tracks removably disposed on at least a portion of a second end of the body to receive the plurality of second rollers therein.

The platform assembly may further include a fulcrum disposed within at least a portion of a center of a base of the body and pivotally connected to the main platform to pivot the main platform in a seesaw motion, at least one first energy absorber disposed on at least a portion of the base of the body at a first end of the main platform to prevent damage to the main platform in response to contact by the main platform, and at least one second energy absorber disposed on at least a portion of the base of the body at a second end of the main platform to prevent damage to the main platform in response to contact by the main platform.

The platform assembly may further include a plurality of hydraulic cylinders disposed on at least a portion of the base of the body to move the main platform in response to moving from retracted in a first position to at least partially extended in a second position.

The plurality of hydraulic cylinders may move independently with respect to each other.

The plurality of hydraulic cylinders may move simultaneously with respect to each other.

The body may be at least one of an airplane, a spaceplane, a helicopter, an airship, a glider, a paramotor, and a hot air balloon.

The body may be padded on an interior portion thereof.

The platform assembly may adjust movement speed based on a position of the body during flight.

The platform assembly may exert at least one of a reduced gravity force and an enhanced gravity force.

The gravity simulation aircraft may fly a parabolic flight.

The gravity simulation aircraft may fly a sub-orbital flight.

The computing system may receive a selected gravity level based on at least one of a moon, a planet, a star, and an interstellar body.

The computing system may receive a selected gravity level based on a gravitational force equivalent.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Gravity Simulation System 1
Computing System 100
Input Unit 110
Display Unit 120
Processing Unit 130

Communications Unit 140
Storage Unit 150
Gravity Simulation Aircraft 200
Body 210
Platform Assembly 220
Main Platform 221
First Auxiliary Platform 222
Second Auxiliary Platform 223
Auxiliary Rails 224
First Auxiliary Rollers 225
Second Auxiliary Rollers 226
First Rod 227
Second Rod 228
Track Assembly 230
First Tracks 231
Second Tracks 232
Rollers 240
First Rollers 241
Second Rollers 242
First Axle 243
Second Axle 244
Motor 250
Transceiver 260
Gravity Simulation Aircraft 300
Body 310
Platform Assembly 320
Main Platform 321
Fulcrum 322
First Energy Absorber 323
Second Energy Absorber 324
Motor 330
Transceiver 340
Gravity Simulation Aircraft 400
Body 410
Platform Assembly 420
Main Platform 421
Plurality of Hydraulic Cylinders 422
Motor 430
Transceiver 440

Figure 1:
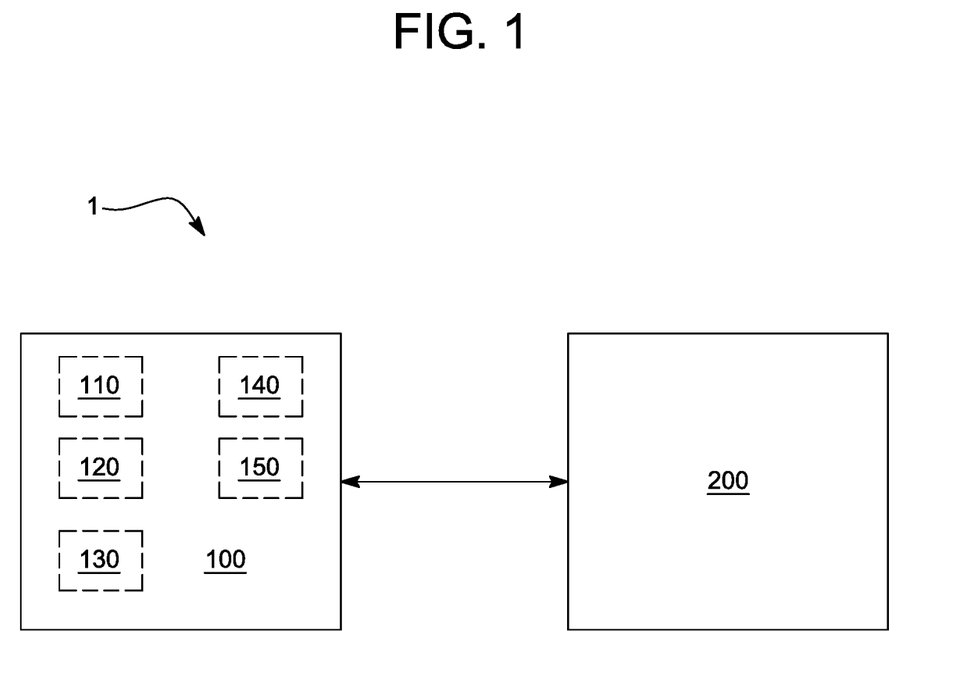
FIG. 1 illustrates a gravity simulation system, according to an exemplary embodiment of the present general inventive concept.

FIG. 1 illustrates a gravity simulation system 1, according to an exemplary embodiment of the present general inventive concept.

The gravity simulation system 1 may include a computing system 100 and a gravity simulation aircraft 200, but is not limited thereto.

The computing system 100 may include an input unit 110, a display unit 120, a processing unit 130, a communication unit 140, and a storage unit 150, but is not limited thereto.

The input unit 110 may include a keyboard, a touchpad, a mouse, a trackball, a stylus, a voice recognition unit, a visual data reader, a camera, a wireless device reader, a fingerprint reader, an iris scanner, a facial recognition unit, and a holographic input unit.

The display unit 120 may include a plasma screen, an LCD screen, a light emitting diode (LED) screen, an organic LED (OLED) screen, a computer monitor, a hologram output unit, a sound outputting unit, or any other type of device that visually or aurally displays data.

Also, the display unit 120 may be combined with the input unit 110 to be a touch-screen.

The processing unit 130 (or central processing unit, CPU) may include electronic circuitry to carry out instructions of a computer program by performing basic arithmetic, logical, control and input/output (I/O) operations specified by the instructions. The processing unit 130 may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The processing unit 130 may also include a microprocessor and a microcontroller.

The communication unit 140 may include a device capable of wireless or wired communication between other wireless or wired devices via at least one of Wi-Fi, Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, USB, global positioning system (GPS), Firewire, and Ethernet.

The storage unit 150 may include a random access memory (RAM), a read-only memory (ROM), a hard disk, a flash drive, a database connected to the Internet, cloud-based storage, Internet-based storage, or any other type of storage unit.

The computing system 100 may access the Internet via the communication unit 140 to allow at least one user to access a website, and/or may allow a software application and/or a mobile application to be executed using the processing unit 130. For ease of description, the software application and/or the mobile application will be hereinafter referred to as an app. The app may be downloaded from the Internet and/or installed via a computer-readable medium to be stored on the storage unit 150.

The computing system 100 may use the app via the input unit 110 and/or the communication unit 140 to send a flight setting and/or a gravity setting for the gravity simulation aircraft 200. For example, the input unit 110 may receive the flight setting and/or the gravity setting into the app to identify a flight trajectory and/or a flight pattern for the gravity simulation aircraft 200, such as parabolic flight and/or sub-orbital flight (i.e. spaceflight where the spacecraft reaches outer space, but the trajectory intersects the atmosphere or the gravitating body from which the spacecraft was launched).

Also, the processing unit 130 may use the app to determine the gravity setting via a predetermined gravity algorithm. For example, the predetermined gravity algorithm may include Newton's law of universal gravitation $(F=G*m1*m2/r^2)$ that states F (force of gravity) is equivalent to G (gravitational constant) multiplied by m1 (mass of a first object) and m2 (mass of a second object) divided by $r^2$ (distance between a center of the first object and a center of the second object).

In other words, the processing unit 130 may generate a gravity simulation using the app to determine a gravity environment based on the flight setting and/or the gravity setting for the gravity simulation aircraft 200.

The computing system 100 may be removably disposed within the gravity simulation aircraft 200 and/or remotely connected via the communication unit 140.

Figure 2A:
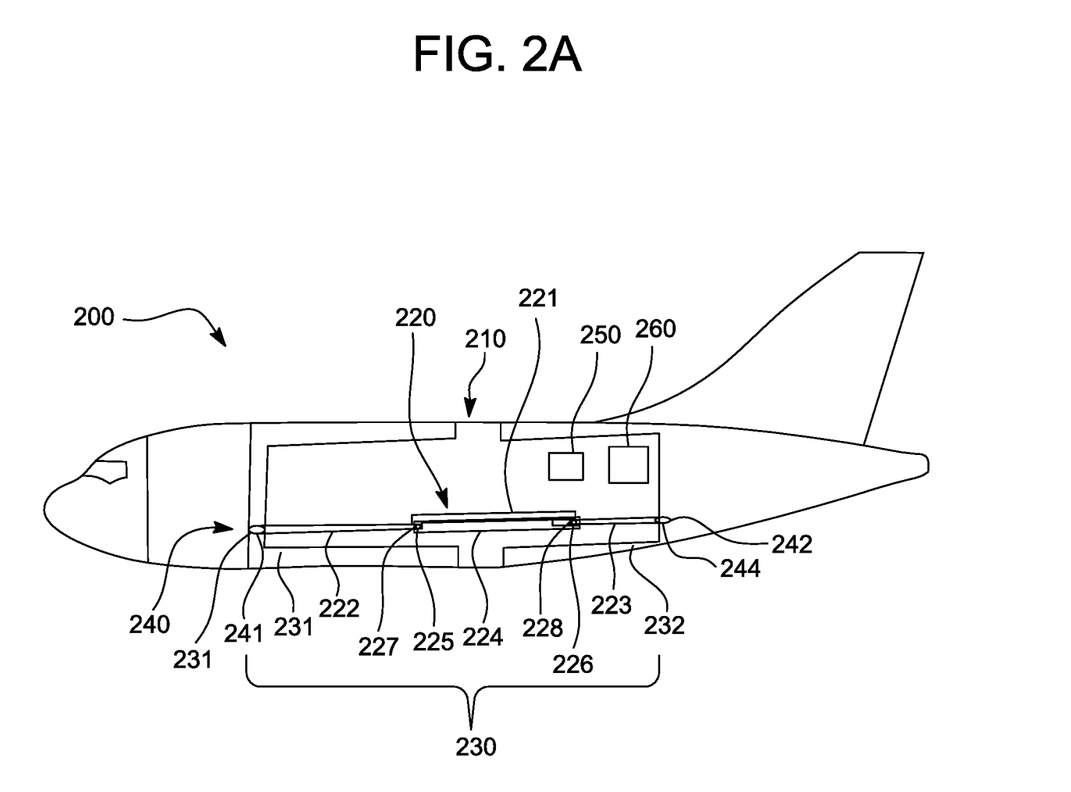
FIG. 2A illustrates a side sectional view of a gravity simulation aircraft including a platform assembly in a lateral position, according to an exemplary embodiment of the present general inventive concept.

FIG. 2A illustrates a side sectional view of a gravity simulation aircraft 200 including a platform assembly 220 in a lateral position, according to an exemplary embodiment of the present general inventive concept.

Figure 2B:
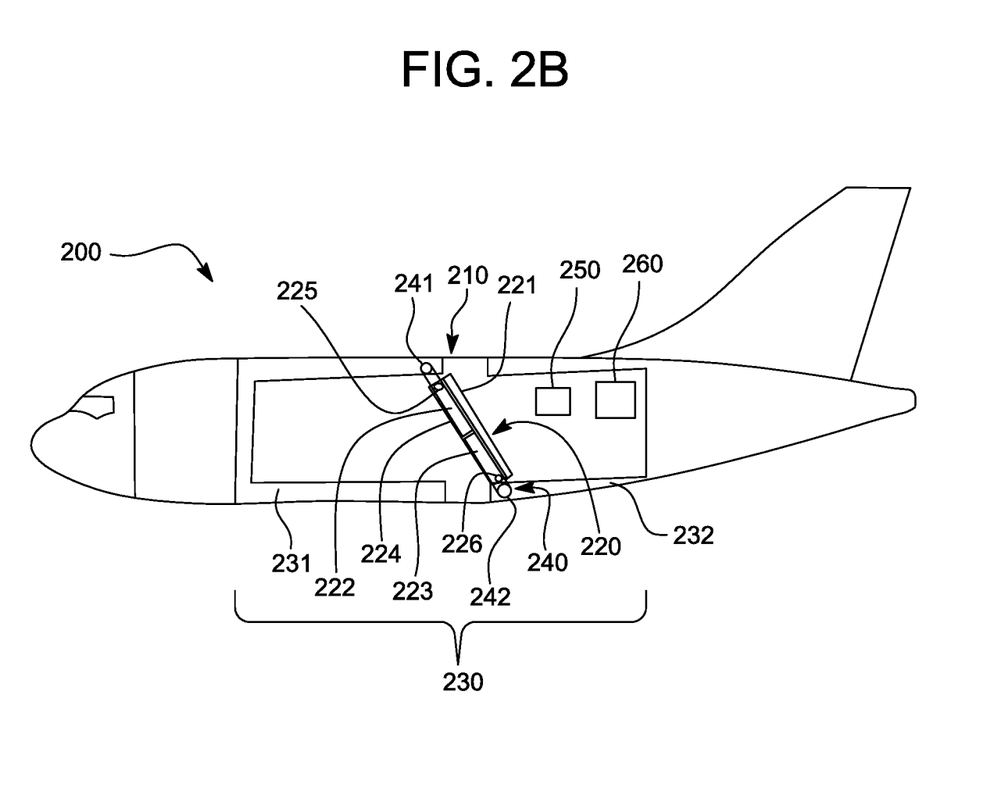
FIG. 2B illustrates a side sectional view of the gravity simulation aircraft including the platform assembly in a vertical position, according to an exemplary embodiment of the present general inventive concept.

FIG. 2B illustrates a side sectional view of the gravity simulation aircraft 200 including the platform assembly 220 in a vertical position, according to an exemplary embodiment of the present general inventive concept.

Figure 2C:
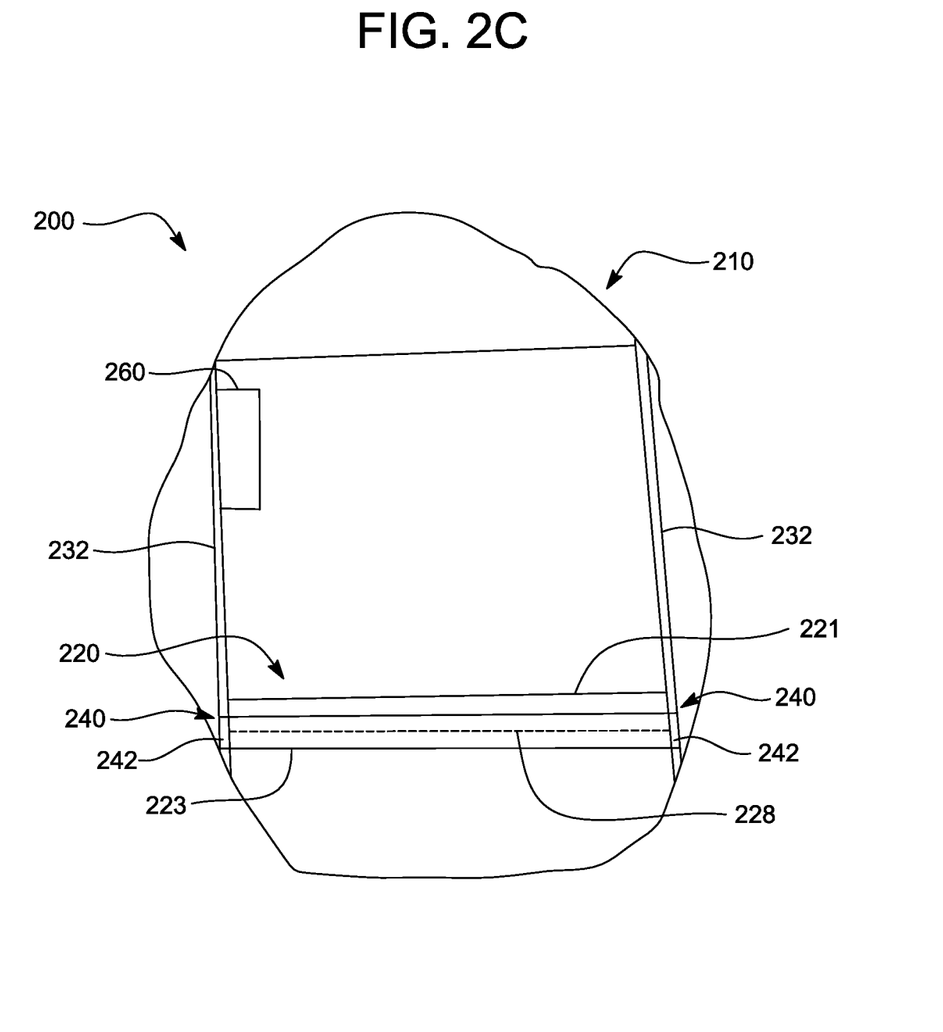
FIG. 2C illustrates a rear sectional view of the gravity simulation aircraft, according to an exemplary embodiment of the present general inventive concept.

FIG. 2C illustrates a rear sectional view of the gravity simulation aircraft 200, according to an exemplary embodiment of the present general inventive concept.

The gravity simulation aircraft 200 may include a body 210, a platform assembly 220, a track assembly 230, a plurality of rollers 240, a motor 250, and a transceiver 260, but is not limited thereto.

The body 210 may include an airplane, a spaceplane, a helicopter, an airship, a glider, a paramotor, and a hot air balloon, but is not limited thereto.

The platform assembly 220 may include a main platform 221, a first auxiliary platform 222, a second auxiliary platform 223, a plurality of auxiliary rails 224, a plurality of first auxiliary rollers 225, a plurality of second auxiliary rollers 226, a first rod 227, and a second rod 228, but is not limited thereto.

Referring to FIGS. 2A and 2B, the main platform 221 may be disposed within at least a portion of an interior of the body 210. Additionally, the main platform 221 may have a length extending from a base of the body 210 to a ceiling of the body 210 while the main platform 221 is in a vertical position. The main platform 221 may receive the at least one user thereon.

The first auxiliary platform 222 and/or the second auxiliary platform 223 may be removably disposed on at least a portion of a bottom surface of the main platform 221. Moreover, the plurality of auxiliary rails 224 may be disposed on at least a portion of the main platform 221. More specifically, the plurality of auxiliary rails 224 may be disposed on at least a portion of a first side of the main platform 221 and/or a second side of the main platform 221 opposite with respect to the first side, such that the plurality of auxiliary rails 224 may suspend under the main platform 221 toward the base of the body 210.

Also, the main platform 221, the first auxiliary platform 222, the second auxiliary platform 223, and/or each wall of the body 210 may be padded (i.e. cushion, foam, etc.) to absorb an impact thereto. In other words, the interior of the body 210 may be padded on at least a portion thereof.

Each of the plurality of first auxiliary rollers 225 may be disposed within the plurality of auxiliary rails 224 on a first end of the first side and/or the second side of the main platform 221. As such, the first auxiliary platform 222 may move at least partially in a first direction (i.e away from a center of the main platform 221) or a second direction (i.e. toward the center of the main platform 221) in response to the plurality of first auxiliary rollers 225 moving (i.e. rotating) at least a portion of a length of the plurality of auxiliary rails 224.

Each of the plurality of second auxiliary rollers 226 may be disposed within the plurality of auxiliary rails 224 on a second end of the first side and/or the second side of the main platform 221. As such, the second auxiliary platform 223 may move at least partially in the first direction or the second direction in response to the plurality of second auxiliary rollers 226 moving at least a portion of a length of the plurality of auxiliary rails 224. Also, the second auxiliary platform 223 may move in a direction opposite with respect to the first auxiliary platform 223. For example, the second auxiliary platform 223 may move at least partially in the first direction to the right with respect to a right side view of the body 210, while the first auxiliary platform 222 moves at least partially in the first direction to the left, when the first auxiliary platform 222 and/or the second auxiliary platform 223 move away from the center of the main platform 221.

Furthermore, the first rod 227 may be disposed on and/or within at least a portion of the first auxiliary platform 222 and connect each of the plurality of first auxiliary rollers 225 to each other. As such, the first rod 227 may move in response to movement of the plurality of first auxiliary rollers 225. Similarly, the second rod 228 may be disposed on and/or within at least a portion of the second auxiliary platform 223 and connect each of the plurality of second auxiliary rollers 226 to each other. As such, the second rod 228 may move in response to movement of the plurality of second auxiliary rollers 226.

The track assembly 230 may include a plurality of first tracks 231 and a plurality of second tracks 232, but is not limited thereto.

Referring again to FIGS. 2A and 2B, the plurality of first tracks 231 may be removably disposed on at least a portion of a first end of the body 210 (i.e. a cockpit), extending from a center portion of the ceiling of the body 210 toward a front of the body 210 (i.e. cockpit), from the ceiling of the body 210 to the base of the body 210, and from the front of the body 210 toward the a center portion of the base of the body 210. Also, the plurality of second tracks 232 may be removably disposed on at least a portion of a second end of the body 210 (i.e. a tail), extending from the center portion of the ceiling of the body 210 toward a rear of the body 210, from the ceiling of the body 210 to the base of the body 210, and toward the center portion of the base of the body 210.

Therefore, the plurality of first tracks 231 and/or the plurality of second tracks 232 may be adjusted to have a different course. For example, the plurality of first tracks 231 and/or the plurality of second tracks 232 may have a linear arrangement extending from the ceiling of the body 210 to the base of the body 210 (i.e. top to bottom of the body 210) instead of the arrangement illustrated in FIGS. 2A and 2B.

The plurality of rollers 240 may include a plurality of first rollers 241, a plurality of second rollers 242, a first axle 243, and a second axle 244, but is not limited thereto.

Each of the plurality of first rollers 241 may be disposed within the plurality of first tracks 231. In other words, the plurality of first tracks 231 may receive the plurality of first rollers 241 therein. As such, the first auxiliary platform 222 may move in the first direction or the second direction in response to the plurality of first rollers 241 moving (i.e. rotating) at least a portion of a length of the plurality of first tracks 231. Accordingly, the plurality of first rollers 241 and/or the plurality of first auxiliary rollers 225 may move simultaneously.

Each of the plurality of second rollers 242 may be disposed within the plurality of second tracks 232. In other words, the plurality of second tracks 232 may receive the plurality of second rollers 242 therein. As such, the second auxiliary platform 223 may move in the first direction or the second direction in response to the plurality of second rollers 242 moving at least a portion of a length of the plurality of second tracks 232. Accordingly, the plurality of second rollers 242 and/or the plurality of second auxiliary rollers 226 may move simultaneously.

As such, the first auxiliary platform 222 may move at least partially toward a center of the ceiling of the body 210 in the first direction and move at least partially toward a center of the base of the body 210 in the second direction. In a reciprocal movement, the second auxiliary platform 223 may move at least partially toward the center of the base of the body 210 in the first direction and move at least partially toward the center of the ceiling of the body 210 in the second direction. Accordingly, the main platform 221, the first auxiliary platform 222, and/or the second auxiliary platform 223 may be oriented in horizontal and/or vertical positions.

Furthermore, the first axle 243 may be disposed on and/or within at least a portion of the first auxiliary platform 222 and connect each of the plurality of first rollers 241 to each other. As such, the first axle 243 may move in response to movement of the plurality of first rollers 241. Similarly, the second axle 244 may be disposed on and/or within at least a portion of the second auxiliary platform 223 and connect each of the plurality of second rollers 242 to each other. As such, the second axle 244 may move in response to movement of the plurality of second rollers 242.

Referring again to FIGS. 2A and 2B, the motor 250 is illustrated to be disposed on the body 210. However, the motor 250 may be disposed on at least a portion of the platform assembly 220, the track assembly 230, and/or the plurality of rollers 240. Furthermore, the motor 250 may be mechanically and/or electrically connected to the platform assembly 220.

The platform assembly 220 and/or the plurality of rollers 240 may move in response to rotation of the motor 250. Additionally, the motor 250 may rotate in response to at least one command received from the computing system 100 via the transceiver 260.

During operation, the computing system 100 via the app may create the flight setting and/or the gravity setting, such that body 210 flies a parabolic flight and/or a sub-orbital flight. Moreover, the platform assembly 220 may move based on the gravity setting of the app. For example, the force of gravity calculated by the processing unit 130 may differ between a gravity level on a moon (e.g., the Moon, Io, Callisto, Titan, Triton, etc.) compared to a gravity level on a planet (e.g., Mars, Jupiter, Neptune, etc.).

As such, the platform assembly 220 may move at a speed level based on the processing unit 130 determining the gravity setting corresponding to a selected gravity level. More specifically, the input unit 131 of the computing system 100 may receive the selected gravity level in the app based on selecting the moon, the planet, a star, and/or an interstellar body. Alternatively, the input unit 131 of the computing system 100 may receive the selected gravity level in the app based on a number input into the app, such as acceleration in meters per second squared ($m/s^2$) and/or gravitational force equivalent (g or g-force). For example, the processing unit 133 of the computing system would calculate the selected gravity level using the predetermined gravity algorithm as 1.62 m/s and/or 0.1654 g in response to the input unit 131 receiving the Moon for the simulation. Also, the platform assembly 220 may move based on the flight setting and a current flight state of the body 210. In other words, the platform assembly 220 may move at a different speed based on whether the body 210 is at a top of a parabola and/or at a bottom of the parabola during the parabolic flight.

Therefore, the platform assembly 220 may exert a reduced gravity force (i.e. gravity less than Earth) and/or an enhanced gravity force (i.e. gravity greater than Earth) on the at least one user within the body 210 during flight within the body 210.

Figure 3:
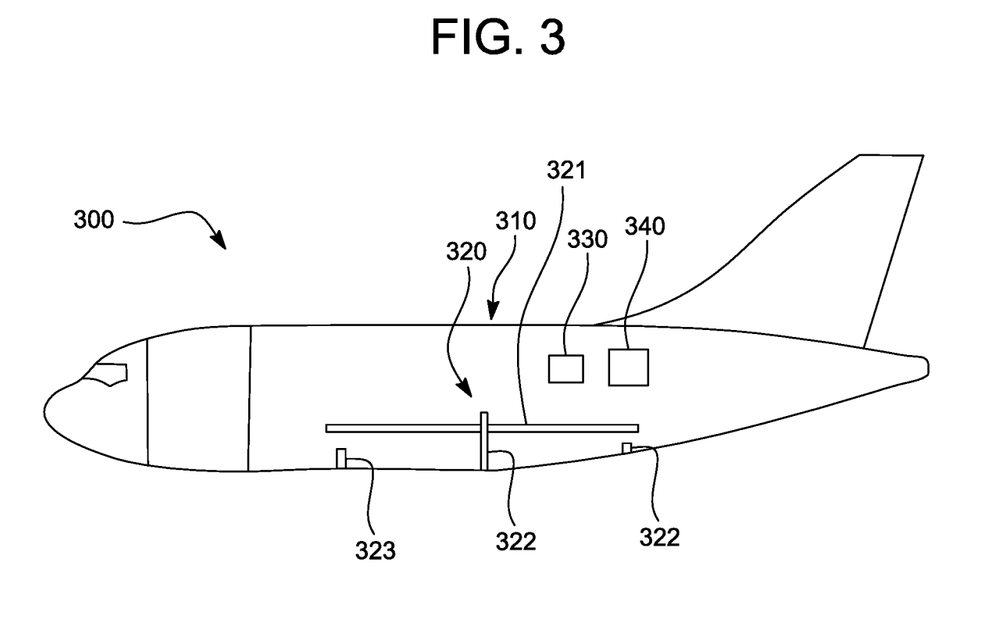
FIG. 3 illustrates a side sectional view of a gravity simulation aircraft including a platform assembly in a lateral position, according to another exemplary embodiment of the present general inventive concept.

FIG. 3 illustrates a side sectional view of a gravity simulation aircraft 300 including a platform assembly 320 in a lateral position, according to another exemplary embodiment of the present general inventive concept.

As discussed above with respect to the gravity simulation aircraft 200, the processing unit 130 of the computing system 100 may generate a gravity simulation using the app to determine the flight setting and/or the gravity setting for the gravity simulation aircraft 300.

Also, the computing system 100 may be removably disposed within the gravity simulation aircraft 300 and/or remotely connected via the communication unit 140.

As such, the gravity simulation system 1 may include the computing system 100 and the gravity simulation aircraft 300. Moreover, operations of the computing system 100 with respect to the gravity simulation aircraft 200 apply to the gravity simulation aircraft 300.

The gravity simulation aircraft 300 may include a body 310, a platform assembly 320, a motor 330, and a transceiver 340, but is not limited thereto.

The body 310 may include an airplane, a spaceplane, a helicopter, an airship, a glider, a paramotor, and a hot air balloon, but is not limited thereto.

The platform assembly 320 may include a main platform 321, a fulcrum 322, at least one first energy absorber 323, and at least one second energy absorber 324, but is not limited thereto.

Referring to FIG. 3, the main platform 321 may be disposed within at least a portion of an interior of the body 310. Additionally, the main platform 321 may have a length extending from a base of the body 310 to a ceiling of the body 310 while the main platform 321 is in a vertical position, similar to the position of the main platform 221 in FIG. 2B. The main platform 321 may receive the at least one user thereon.

Also, the main platform 321 and/or each wall of the body 310 may be padded (i.e. cushion, foam, etc.) to absorb an impact thereto. In other words, the interior of the body 310 may be padded on at least a portion thereof.

The fulcrum 322 may be disposed within at least a portion of the interior of the body 310. More specifically, the fulcrum 322 may be disposed at a center of the base of the body 310. Additionally, a center of the main platform 321 may be pivotally disposed on at least a portion of the fulcrum 322. As such, the main platform 321 may pivot about the fulcrum 322, such that a first end of the main platform 321 may move toward the ceiling of the body 310 (i.e. up) in response to a second end of the main platform 321 moving toward the base of the body 310 (i.e. down). Conversely, the main platform 321 may pivot about the fulcrum 322, such that the first end of the main platform 321 may move toward the base of the body 310 in response to the second end of the main platform 321 moving toward the ceiling of the body 310.

Therefore, the main platform 321 may pivot on the fulcrum 322 in a seesaw motion.

The at least one first energy absorber 323 may include a spring, a cushion, a shock absorber, and a damper, but is not limited thereto.

The at least one second energy absorber 324 may include a spring, a cushion, a shock absorber, and a damper, but is not limited thereto.

Referring to FIG. 3, the at least one first energy absorber 323 and/or the at least one second energy absorber 324 are illustrated to be disposed on the base of the body 310. However, the at least one first energy absorber 323 and/or the at least one second energy absorber 324 may be disposed on at least a portion of the main platform 321.

The at least one first energy absorber 323 and/or the at least one second energy absorber 324 may prevent damage to the main platform 321 during movement, such that the at least one first energy absorber 323 and/or the at least one second energy absorber 324 may receive the first end and/or the second end of the main platform 321 thereupon, respectively. In other words, the at least one first energy absorber 323 and/or the at least one second energy absorber 324 may absorb momentum of the main platform 321 and/or dissipate energy from movement of the main platform 321 in response to contacting the at least one first energy absorber 323 and/or the at least one second energy absorber 324.

Referring again to FIG. 3, the motor 330 is illustrated to be disposed on the body 310. However, the motor 330 may be disposed on at least a portion of the platform assembly 320. Furthermore, the motor 330 may be mechanically and/or electrically connected to the platform assembly 320.

The platform assembly 320 may move in response to rotation of the motor 330. Additionally, the motor 330 may rotate in response to at least one command received from the computing system 100 via the transceiver 340.

During operation, the computing system 100 via the app may create the flight setting and/or the gravity setting, such that body 310 flies a parabolic flight and/or a sub-orbital flight. Moreover, the platform assembly 320 may move based on the gravity setting of the app. For example, the force of gravity calculated by the processing unit 130 may differ between a gravity level on a moon (e.g., the Moon, Io, Callisto, Titan, Triton, etc.) compared to a gravity level on a planet (e.g., Mars, Jupiter, Neptune, etc.).

As such, the platform assembly 320 may move at a speed level based on the processing unit 130 determining the gravity setting corresponding to a selected gravity level. More specifically, the input unit 131 of the computing system 100 may receive the selected gravity level in the app based on selecting the moon, the planet, a star, and/or an interstellar body. Alternatively, the input unit 131 of the computing system 100 may receive the selected gravity level in the app based on a number input into the app, such as acceleration in meters per second squared (m/s$^2$) and/or gravitational force equivalent (g or g-force). For example, the processing unit 133 of the computing system would calculate the selected gravity level using the predetermined gravity algorithm as 1.62 m/s and/or 0.1654 g in response to the input unit 131 receiving the Moon for the simulation. Also, the platform assembly 320 may move based on the flight setting and a current flight state of the body 310. In other words, the platform assembly 320 may move at a different speed based on whether the body 310 is at a top of a parabola and/or at a bottom of the parabola during the parabolic flight.

Therefore, the platform assembly 320 may exert a reduced gravity force and/or an enhanced gravity force on the at least one user within the body 310 during flight within the body 310.

Figure 4:
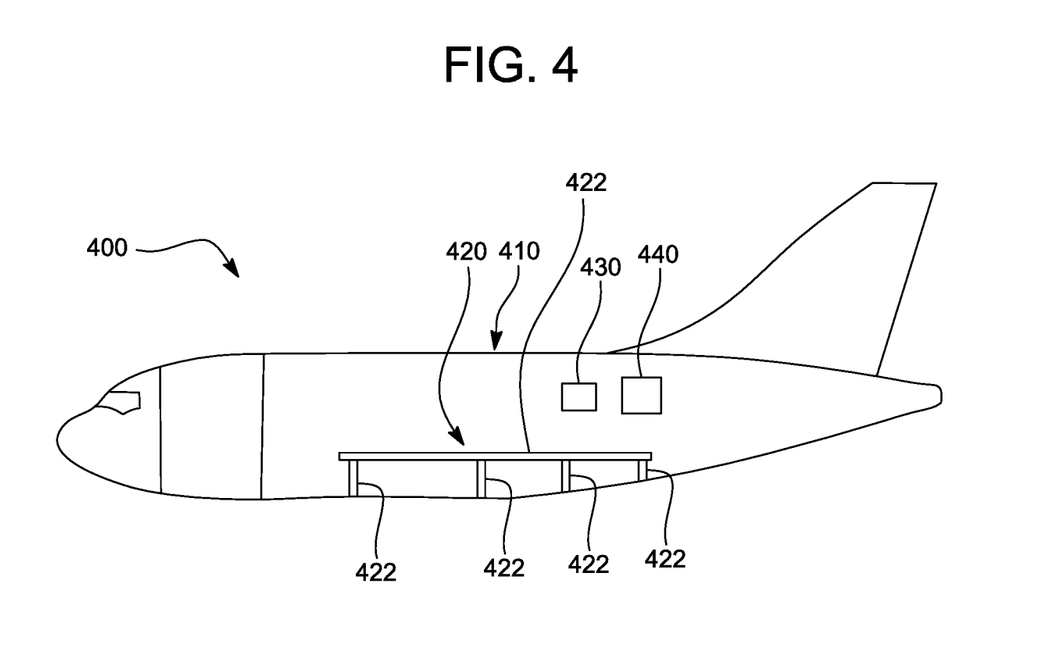
FIG. 4 illustrates a side sectional view of a gravity simulation aircraft including a platform assembly in a lateral position, according to another exemplary embodiment of the present general inventive concept.

FIG. 4 illustrates a side sectional view of a gravity simulation aircraft 400 including a platform assembly 420 in a lateral position, according to another exemplary embodiment of the present general inventive concept.

As discussed above with respect to the gravity simulation aircraft 200, the processing unit 130 of the computing system 100 may generate a gravity simulation using the app to determine the flight setting and/or the gravity setting for the gravity simulation aircraft 400.

Also, the computing system 100 may be removably disposed within the gravity simulation aircraft 400 and/or remotely connected via the communication unit 140.

As such, the gravity simulation system 1 may include the computing system 100 and the gravity simulation aircraft 400. Moreover, operations of the computing system 100 with respect to the gravity simulation aircraft 200 apply to the gravity simulation aircraft 400.

The gravity simulation aircraft 400 may include a body 410, a platform assembly 420, a motor 430, and a transceiver 440, but is not limited thereto.

The body 410 may include an airplane, a spaceplane, a helicopter, an airship, a glider, a paramotor, and a hot air balloon, but is not limited thereto.

The platform assembly 420 may include a main platform 421 and a plurality of hydraulic cylinders 422, but is not limited thereto.

Referring to FIG. 4, the main platform 421 may be disposed within at least a portion of an interior of the body 410. Additionally, the main platform 421 may have a length extending from a base of the body 410 to a ceiling of the body 410 while the main platform 421 is in a vertical position, similar to the position of the main platform 221 in FIG. 2B. The main platform 421 may receive the at least one user thereon.

Also, the main platform 421 and/or each wall of the body 410 may be padded (i.e. cushion, foam, etc.) to absorb an impact thereto. In other words, the interior of the body 410 may be padded on at least a portion thereof.

The plurality of hydraulic cylinders 422 may be disposed within at least a portion of the interior of the body 410. More specifically, the plurality of hydraulic cylinders 422 may be disposed on the base of the body 410 to connect to the main platform 421 thereon. In other words, the main platform 421 may be disposed on the plurality of hydraulic cylinders 422.

The plurality of hydraulic cylinders 422 may move from retracted in a first position to at least partially extended in a second position, such that the main platform 421 moves in response to movement of the plurality of hydraulic cylinders 422. Moreover, each of the plurality of hydraulic cylinders 422 may move independently and/or simultaneously with respect to each other.

For example, the main platform 421 may move on the plurality of hydraulic cylinders 422, such that a first end of the main platform 421 may move at least partially toward the ceiling of the body 410 (i.e. up) while a second end of the main platform 421 moves at least partially toward the base of the body 410 (i.e. down). Conversely, the main platform 421 may move on the plurality of hydraulic cylinders 422, such that the first end of the main platform 421 may move at least partially toward the base of the body 410 while the second end of the main platform 421 moves at least partially toward the ceiling of the body 410.

Referring again to FIG. 4, the motor 430 is illustrated to be disposed on the body 410. However, the motor 430 may be disposed on at least a portion of the platform assembly 420. Furthermore, the motor 430 may be mechanically and/or electrically connected to the platform assembly 420.

The platform assembly 420 may move in response to rotation of the motor 430. Additionally, the motor 430 may rotate in response to at least one command received from the computing system 100 via the transceiver 440.

During operation, the computing system 100 via the app may create the flight setting and/or the gravity setting, such that body 410 flies a parabolic flight and/or a sub-orbital flight. Moreover, the platform assembly 420 may move based on the gravity setting of the app. For example, the force of gravity calculated by the processing unit 130 may differ between a gravity level on a moon (e.g., the Moon, Io, Callisto, Titan, Triton, etc.) compared to a gravity level on a planet (e.g., Mars, Jupiter, Neptune, etc.).

As such, the platform assembly 420 may move at a speed level based on the processing unit 130 determining the gravity setting corresponding to a selected gravity level. More specifically, the input unit 131 of the computing system 100 may receive the selected gravity level in the app based on selecting the moon, the planet, a star, and/or an interstellar body. Alternatively, the input unit 131 of the computing system 100 may receive the selected gravity level in the app based on a number input into the app, such as acceleration in meters per second squared (m/s$^2$) and/or gravitational force equivalent (g or g-force). For example, the processing unit 133 of the computing system would calculate the selected gravity level using the predetermined gravity algorithm as 1.62 m/s and/or 0.1654 g in response to the input unit 131 receiving the Moon for the simulation. Also, the platform assembly 420 may move based on the flight setting and a current flight state of the body 410. In other words, the platform assembly 420 may move at a different speed based on whether the body 410 is at a top of a parabola and/or at a bottom of the parabola during the parabolic flight.

Therefore, the platform assembly 420 may exert a reduced gravity force and/or an enhanced gravity force on the at least one user within the body 410 during flight within the body 410.

The present general inventive concept may include a gravity simulation system 1, including a computing system 100 running a program thereon to receive input for a gravity environment and calculate the gravity environment based on a predetermined gravity algorithm, and a gravity simulation aircraft 200 connected to the computing system 100 to simulate the gravity environment received from the computing system 100 based on at least one of a flight setting and a gravity setting.

The gravity simulation aircraft 200 may include a body 210, and a platform assembly 220 disposed within at least a portion of the body 210 to move based on at least one of the flight setting and the gravity setting.

The gravity simulation aircraft 200 may further include a transceiver 260 disposed within at least a portion of the body 210 to receive at least one command from the computing system 100, and a motor 250 connected to the transceiver 260 and the platform assembly 220 to move the platform assembly 220 in response to the at least one command received from the transceiver 260.

The platform assembly 220 may include a main platform 221 to receive at least one user thereon.

The platform assembly 220 may further include a first auxiliary platform 222 removably disposed on at least a portion of a bottom surface of the main platform 221, a second auxiliary platform 223 removably disposed on at least a portion of the bottom surface of the main platform 221, a plurality of auxiliary rails 224 disposed on a first side and a second side of the main platform 221 to suspend therefrom, a plurality of first auxiliary rollers 225 disposed within at least a portion of the plurality of auxiliary rails 224 at a first end of the main platform 221 to move the first auxiliary platform 222 at least partially away from a center of the main platform 221 in response to rotating in a first direction, and to move the first auxiliary platform 222 at least partially toward the center of the main platform 221 in response to rotating in a second direction, a plurality of second auxiliary rollers 226 disposed within at least a portion of the plurality of auxiliary rails 224 at a second end of the main platform 221 to move the second auxiliary platform 223 at least partially away from a center of the main platform 221 in response to rotating in the second direction, and to move the second auxiliary platform 223 at least partially toward the center of the main platform 221 in response to rotating in the first direction, such that the first auxiliary platform 222 and the second auxiliary platform 223 move in opposite directions, a first rod 227 disposed on at least a portion of the first auxiliary platform 222 to connect each of the plurality of first auxiliary rollers 225, and a second rod 228 disposed on at least a portion of the second auxiliary platform 223 to connect each of the plurality of second auxiliary rollers 226.

The gravity simulation system 1 may further include a track assembly 230 disposed within at least a portion of the body 210, and a plurality of rollers 240, including a plurality of first rollers 241 disposed within at least a portion of the track assembly 230 to move the first auxiliary platform 222 at least partially toward a center of a ceiling of the body 210 in response to rotating in the first direction, and to move the first auxiliary platform 222 at least partially toward a center of a base of the body 210 in response to rotating in the second direction, a plurality of second rollers 242 disposed within at least a portion of the track assembly 230 to move the second auxiliary platform 223 at least partially toward the center of the base of the body 210 in response to rotating in the first direction, and to move the second auxiliary platform 223 at least partially toward the center of the ceiling of the body 210 in response to rotating in the second direction, a first axle 243 disposed on at least a portion of the first auxiliary platform 222 to connect each of the plurality of first rollers 241, and a second axle 244 disposed on at least a portion of the second auxiliary platform 223 to connect each of the plurality of second rollers 242.

The track assembly 230 may include a plurality of first tracks 231 removably disposed on at least a portion of a first end of the body 210 to receive the plurality of first rollers 241 therein, and a plurality of second tracks 232 removably disposed on at least a portion of a second end of the body 210 to receive the plurality of second rollers 242 therein.

The platform assembly 320 may further include a fulcrum 322 disposed within at least a portion of a center of a base of the body 310 and pivotally connected to the main platform 321 to pivot the main platform 321 in a seesaw motion, at least one first energy absorber 323 disposed on at least a portion of the base of the body 310 at a first end of the main platform 321 to prevent damage to the main platform 321 in response to contact by the main platform 321, and at least one second energy absorber 324 disposed on at least a portion of the base of the body 310 at a second end of the main platform 321 to prevent damage to the main platform 321 in response to contact by the main platform 321.

The platform assembly 420 may further include a plurality of hydraulic cylinders 422 disposed on at least a portion of the base of the body 410 to move the main platform 421 in response to moving from retracted in a first position to at least partially extended in a second position.

The plurality of hydraulic cylinders 422 may move independently with respect to each other.

The plurality of hydraulic cylinders 422 may move simultaneously with respect to each other.

The body 210 may be at least one of an airplane, a spaceplane, a helicopter, an airship, a glider, a paramotor, and a hot air balloon.

The body 210 may be padded on an interior portion thereof.

The platform assembly 220 may adjust movement speed based on a position of the body 210 during flight.

The platform assembly 220 may exert at least one of a reduced gravity force and an enhanced gravity force.

The gravity simulation aircraft 200 may fly a parabolic flight.

The gravity simulation aircraft 200 may fly a sub-orbital flight.

The computing system 100 may receive a selected gravity level based on at least one of a moon, a planet, a star, and an interstellar body.

The computing system 100 may receive a selected gravity level based on a gravitational force equivalent.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A gravity simulation system, comprising:
a computing system running a program thereon to receive input for a gravity environment and calculate the gravity environment based on a predetermined gravity algorithm; and
a gravity simulation aircraft connected to the computing system to simulate the gravity environment received from the computing system based on at least one of a flight setting and a gravity setting, the gravity simulation aircraft comprising:
a body, and
a platform assembly disposed within at least a portion of the body to move based on at least one of the flight setting and the gravity setting, the platform assembly comprising:
a main platform to receive at least one user thereon,
a fulcrum disposed within at least a portion of a center of a base of the body and pivotally connected to the main platform to pivot the main platform in a seesaw motion,
at least one first energy absorber disposed on at least a portion of the base of the body at a first end of the main platform to prevent damage to the main platform in response to contact by the main platform, and
at least one second energy absorber disposed on at least a portion of the base of the body at a second end of the main platform to prevent damage to the main platform in response to contact by the main platform.

2. The gravity simulation system of claim 1, wherein the gravity simulation aircraft further comprises: a transceiver disposed within at least a portion of the body to receive at least one command from the computing system; and a motor connected to the transceiver and the platform assembly to move the platform assembly in response to the at least one command received from the transceiver.

3. The gravity simulation system of claim 1, wherein the platform assembly further comprises:
a first auxiliary platform removably disposed on at least a portion of a bottom surface of the main platform;
a second auxiliary platform removably disposed on at least a portion of the bottom surface of the main platform;
a plurality of auxiliary rails disposed on a first side and a second side of the main platform to suspend therefrom;
a plurality of first auxiliary rollers disposed within at least a portion of the plurality of auxiliary rails at a first end of the main platform to move the first auxiliary platform at least partially away from a center of the main platform in response to rotating in a first direction, and to move the first auxiliary platform at least partially toward the center of the main platform in response to rotating in a second direction;
a plurality of second auxiliary rollers disposed within at least a portion of the plurality of auxiliary rails at a second end of the main platform to move the second auxiliary platform at least partially away from a center of the main platform in response to rotating in the second direction, and to move the second auxiliary platform at least partially toward the center of the main platform in response to rotating in the first direction, such that the first auxiliary platform and the second auxiliary platform move in opposite directions;
a first rod disposed on at least a portion of the first auxiliary platform to connect each of the plurality of first auxiliary rollers; and
a second rod disposed on at least a portion of the second auxiliary platform to connect each of the plurality of second auxiliary rollers.

4. The gravity simulation system of claim 3, further comprising:
a track assembly disposed within at least a portion of the body; and
a plurality of rollers, comprising:
a plurality of first rollers disposed within at least a portion of the track assembly to move the first auxiliary platform at least partially toward a center of a ceiling of the body in response to rotating in the first direction, and to move the first auxiliary platform at least partially toward a center of a base of the body in response to rotating in the second direction,
a plurality of second rollers disposed within at least a portion of the track assembly to move the second auxiliary platform at least partially toward the center of the base of the body in response to rotating in the first direction, and to move the second auxiliary platform at least partially toward the center of the ceiling of the body in response to rotating in the second direction,
a first axle disposed on at least a portion of the first auxiliary platform to connect each of the plurality of first rollers, and
a second axle disposed on at least a portion of the second auxiliary platform to connect each of the plurality of second rollers.

5. The gravity simulation system of claim 4, wherein the track assembly comprises:
a plurality of first tracks removably disposed on at least a portion of a first end of the body to receive the plurality of first rollers therein; and
a plurality of second tracks removably disposed on at least a portion of a second end of the body to receive the plurality of second rollers therein.

6. The gravity simulation system of claim 1, wherein the platform assembly further comprises:
a plurality of hydraulic cylinders disposed on at least a portion of the base of the body to move the main platform in response to moving from retracted in a first position to at least partially extended in a second position.

7. The gravity simulation system of claim 6, wherein the plurality of hydraulic cylinders move independently with respect to each other.

8. The gravity simulation system of claim 6, wherein the plurality of hydraulic cylinders move simultaneously with respect to each other.

9. The gravity simulation system of claim 1, wherein the body is at least one of an airplane, a spaceplane, a helicopter, an airship, a glider, a paramotor, and a hot air balloon.

10. The gravity simulation system of claim 1, wherein the body is padded on an interior portion thereof.

11. The gravity simulation system of claim 1, wherein the platform assembly adjusts movement speed based on a position of the body during flight.

12. The gravity simulation system of claim 1, wherein the platform assembly exerts at least one of a reduced gravity force and an enhanced gravity force.

13. The gravity simulation system of claim 1, wherein the gravity simulation aircraft flies a parabolic flight.

14. The gravity simulation system of claim 1, wherein the gravity simulation aircraft flies a sub-orbital flight.

15. The gravity simulation system of claim 1, wherein the computing system receives a selected gravity level based on at least one of a moon, a planet, a star, and an interstellar body.

16. The gravity simulation system of claim 1, wherein the computing system receives a selected gravity level based on a gravitational force equivalent.

* * * * *